United States Patent
Iyo et al.

(10) Patent No.: US 10,377,111 B2
(45) Date of Patent: Aug. 13, 2019

(54) COLORED BIAXIALLY STRETCHED POLYESTER FILM FOR METAL PLATE ATTACHMENT AND FORMING PROCESSING

(71) Applicant: TEIJIN FILM SOLUTIONS LIMITED, Tokyo (JP)

(72) Inventors: Naoki Iyo, Tokyo (JP); Mitsuo Tojo, Tokyo (JP)

(73) Assignee: TEIJIN FILM SOLUTIONS LIMITED, Tokyo (JP)

( * ) Notice: Subject to any disclaimer, the term of this patent is extended or adjusted under 35 U.S.C. 154(b) by 118 days.

(21) Appl. No.: 15/359,696

(22) Filed: Nov. 23, 2016

(65) Prior Publication Data

US 2017/0151764 A1 Jun. 1, 2017

(30) Foreign Application Priority Data

Nov. 26, 2015 (JP) ................. 2015-230657

(51) Int. Cl.

| | |
|---|---|
| *B32B 15/09* | (2006.01) |
| *B32B 27/36* | (2006.01) |
| *B32B 7/04* | (2019.01) |
| *B32B 15/18* | (2006.01) |
| *B32B 15/20* | (2006.01) |
| *B32B 27/08* | (2006.01) |
| *B32B 27/20* | (2006.01) |
| *B32B 1/02* | (2006.01) |

(52) U.S. Cl.

CPC ............ *B32B 15/09* (2013.01); *B32B 1/02* (2013.01); *B32B 7/04* (2013.01); *B32B 15/18* (2013.01); *B32B 15/20* (2013.01); *B32B 27/08* (2013.01); *B32B 27/20* (2013.01); *B32B 27/36* (2013.01); *B32B 2250/04* (2013.01); *B32B 2264/102* (2013.01); *B32B 2264/104* (2013.01); *B32B 2270/00* (2013.01); *B32B 2307/306* (2013.01); *B32B 2307/40* (2013.01); *B32B 2307/402* (2013.01); *B32B 2307/4026* (2013.01); *B32B 2307/422* (2013.01); *B32B 2307/518* (2013.01); *B32B 2307/538* (2013.01); *B32B 2307/584* (2013.01); *B32B 2307/70* (2013.01); *B32B 2307/704* (2013.01); *B32B 2307/732* (2013.01); *B32B 2367/00* (2013.01); *B32B 2439/66* (2013.01); *Y10T 428/24355* (2015.01)

(58) Field of Classification Search

CPC .......... B32B 15/09; B32B 27/36; B32B 27/20
See application file for complete search history.

(56) References Cited

U.S. PATENT DOCUMENTS

| | | | | |
|---|---|---|---|---|
| 5,429,855 | A * | 7/1995 | Kotani | B32B 27/20 428/141 |
| 5,780,158 | A * | 7/1998 | Asai | B32B 15/08 428/412 |
| 5,882,784 | A * | 3/1999 | Sumiya | B32B 15/08 428/332 |
| 6,291,053 | B1 * | 9/2001 | Peiffer | B32B 27/08 428/141 |
| 6,309,720 | B1 * | 10/2001 | Shimizu | B32B 15/08 428/212 |
| 6,376,042 | B1 * | 4/2002 | Peiffer | B29C 55/023 264/288.4 |
| 6,420,010 | B1 * | 7/2002 | Hasegawa | B32B 27/20 428/141 |
| 6,645,589 | B2 * | 11/2003 | Fujii | B32B 15/08 428/212 |
| 2002/0068159 | A1 * | 6/2002 | Peiffer | B29C 55/143 428/220 |
| 2004/0076818 | A1 * | 4/2004 | Janssens | B32B 27/20 428/323 |
| 2004/0151900 | A1 * | 8/2004 | Yoshida | B29C 55/023 428/343 |
| 2006/0008638 | A1 * | 1/2006 | Kiehne | B29C 55/023 428/323 |
| 2006/0172100 | A1 * | 8/2006 | Hu | B05D 7/14 428/35.8 |
| 2006/0263592 | A1 * | 11/2006 | Kusume | B32B 27/08 428/327 |
| 2007/0110959 | A1 * | 5/2007 | Yokota | B32B 7/02 428/141 |
| 2007/0134470 | A1 * | 6/2007 | Jesberger | B32B 27/20 428/141 |
| 2007/0177833 | A1 * | 8/2007 | Egami | F16C 17/02 384/279 |

(Continued)

FOREIGN PATENT DOCUMENTS

| | | |
|---|---|---|
| JP | 11-342577 A | 12/1999 |
| JP | 11-348218 A | 12/1999 |

(Continued)

OTHER PUBLICATIONS

Machine translation of JP 2005/288702A, obtained from JPlat-Pat service of the JPO (Year: 2018).*

(Continued)

*Primary Examiner* — Z. Jim Yang
(74) *Attorney, Agent, or Firm* — Sughrue Mion, PLLC

(57) ABSTRACT

A colored biaxially stretched polyester film for metal plate attachment and forming processing, includes three layers: opposite surface layers (layers A) that contain substantially no coloring pigment and are made of a copolyester having an intrinsic viscosity of 0.65 to 0.80 and a melting point (TmA) of 230 to 260° C.; and a core layer (layer B) that has a coloring pigment content of more than 10 wt % and 50 wt % or less and is made of a copolyester having an intrinsic viscosity of 0.55 to 0.70 and a melting point (TmB) of 230 to 260° C. The film has a surface roughness within a range of 10 to 40 nm, and (TmB−TmA) is 4° C. or less.

14 Claims, No Drawings

(56) References Cited

U.S. PATENT DOCUMENTS

| | | | | |
|---|---|---|---|---|
| 2009/0035544 | A1* | 2/2009 | Kusume | B32B 27/36 428/213 |
| 2009/0123697 | A1* | 5/2009 | Matsui | B29C 55/023 428/141 |
| 2010/0119742 | A1* | 5/2010 | Jesberger | B32B 27/20 428/34.8 |
| 2010/0247889 | A1* | 9/2010 | Kliesch | C08J 7/065 428/220 |
| 2012/0302676 | A1* | 11/2012 | Oya | C08J 5/18 524/89 |
| 2013/0065063 | A1* | 3/2013 | Masuda | B32B 27/20 428/423.7 |
| 2014/0020749 | A1* | 1/2014 | Lacrampe | B29C 55/023 136/256 |
| 2014/0162055 | A1* | 6/2014 | Kitagawa | B32B 15/08 428/336 |
| 2017/0151746 | A1* | 6/2017 | Klein | B29C 48/914 |

FOREIGN PATENT DOCUMENTS

| | | | |
|---|---|---|---|
| JP | 2000-037836 A | | 2/2000 |
| JP | 2005288702 A | * | 10/2005 |
| JP | 2005288706 A | * | 10/2005 |
| WO | 2013/002323 A1 | | 1/2013 |
| WO | WO-2013002323 A1 | * | 1/2013 ............ B32B 27/20 |

OTHER PUBLICATIONS

Machine translation of JP 2005/288706A, obtained from JPlat-Pat service of the JPO (Year: 2018).*

Machine translation of JP 5721829B (corresponding to WO 2013/002323 A1), obtained from JPlat-Pat service of the JPO (Year: 2018).*

Machine translation of JP 2005/288706A, obtained from J-Plat-Pat service of the JPO on Nov. 13, 2018 (Year: 2018).*

* cited by examiner

COLORED BIAXIALLY STRETCHED POLYESTER FILM FOR METAL PLATE ATTACHMENT AND FORMING PROCESSING

TECHNICAL FIELD

The present invention relates to a colored biaxially stretched polyester film for metal plate attachment and forming processing. More specifically, it relates to a colored biaxially stretched polyester film for metal plate attachment and forming processing, which has excellent concealability, exhibits excellent forming processability when forming-processed into a container, such as a can, after being attached to a metal plate, and is further excellent in appearance after forming and also in handleability at the time of winding the produced film into a roll.

BACKGROUND ART

Generally, a metal can is coated in order to prevent corrosion of the inner and outer surfaces. In recent years, for the purposes of simplifying the process, improving hygiene, preventing pollution, etc., a method in which a metal can is covered with a thermoplastic resin film, such as a polyester film, has been performed for imparting rust resistance without using an organic solvent. That is, a thermoplastic resin film is laminated to a metal plate of tin, tin-free steel, aluminum, or the like, and then used for food can, beverage can, or aerosol can applications in which cans are subjected to severe forming processing, such as in the case of drawn cans and thinned drawn cans. In terms of cost reduction, cans for these applications have been produced through thinning drawing and ironing under even severer processing conditions.

In the case where such severe forming processing is performed, with the thinning of the metal plate, the resin film is also thinned. Generally, in order to improve the design features, the outer surface of a food can or a beverage can is printed. In a can formed from a resin film-covered metal plate, a resin film containing white or various color pigments is laminated to the metal plate, and the laminated is used as the printing substrate in order to conceal the color of the metal plate. In the case where such a laminate metal plate is subjected to severe processing, the resin thickness significantly decreases, whereby the absolute quantity of the added pigment in the thickness direction decreases, resulting in a problem in that the substrate does not exhibit sufficient concealability. In the case where a large amount of pigment is previously added to the resin film with forethought of this problem, the strength of the resin film decreases. Accordingly, the resin film is likely to be chipped or scratched during processing, and it further happens that the resin film cracks and falls off. Thus, it is difficult to improve the concealability while keeping the strength of the covering resin film high.

For example, a method in which a biaxially stretched polyester film is laminated to a metal plate, and the laminate is used as a material for can manufacturing, has been proposed (JP-A-11-342577, JP-A-2000-37836). However, when forming is performed through severer processing, the resin film is chipped or scratched, or may break in an extreme case. In addition, a method in which an unstretched polyester film is laminated to a metal plate, and the laminate is used as a material for can manufacturing, has been proposed (JP-A-11-348218). However, unstretched films are extremely brittle and likely to be cut during film production or handling, leading to the problem of poor productivity.

In order to solve these problems, WO 2013/002323 proposes a colored biaxially stretched laminate film including a surface layer made of a high-polymerization-degree copolyester and a back layer made of a copolyester having a high concentration of colorant. With this film, it is certainly possible to achieve both concealability and the strength of the resin film.

However, in recent years, for the purposes of relaxing the stress accompanying the strain applied to the film of a laminate metal plate, thereby reducing damage to the film in the subsequent forming processing, a heat treatment is performed in the course of a series of can manufacturing steps. In the heat treatment, in order to balance with the enamel rater value that indicates the presence/absence of coating defects in a polyester film for covering the can inner surface, a higher heat treatment temperature has been required. However, this causes appearance defects in the film as another problem, and there has been a demand for its resolution.

PRIOR ART DOCUMENTS

Patent Documents

[Patent Document 1] JP-A-11-342577
[Patent Document 2] JP-A-2000-37836
[Patent Document 3] JP-A-11-348218
[Patent Document 4] WO 2013/002323

DISCLOSURE OF THE INVENTION

Problems that the Invention is to Solve

The invention has been made against the above background, and an object thereof is to provide a colored biaxially stretched polyester film for metal plate attachment and forming processing, which exhibits excellent forming processability such that even in the case where the film is subjected to severe processing or a high-temperature heat treatment as described above, the film is not chipped, scratched, or peeled off when forming-processed into a can after attachment; from which a formed product, such as a can, having excellent concealability and appearance obtained; and which is excellent in handleability at the time of winding the produced film into a roll.

Means for Solving the Problems

According to the research by the present inventors, it has been found that the above problems can be solved by the following configuration.
1. A colored biaxially stretched polyester film for metal plate attachment and forming processing, including three layers:
opposite surface layers (layers A) that are made of a copolyester having an intrinsic viscosity of 0.65 to 0.80 and a melting point of 230 to 260° C. and contain substantially no coloring pigment; and
a core layer (layer B) that is made of a copolyester having an intrinsic viscosity of 0.55 to 0.70 and a melting point of 230 to 260° C. and has a coloring pigment content of more than 10 wt % and 50 wt % or less,
the colored biaxially stretched polyester film being characterized in that the film has a surface roughness within a range of 10 to 40 cm, and the melting points of the copolyesters of the layers A and the layer B satisfy the following equation (1):

$$TmB - TmA \leq 4° C. \quad (1)$$

wherein TmA represents the melting point of the copolyester of the layers A, and TmB represents the melting point of the copolyester of the layer B.

2. The colored biaxially stretched polyester film for metal plate attachment and forming processing according to 1 above, wherein the copolyesters forming the layers A and the layer B are each an isophthalic acid-copolymerized polyethylene terephthalate.

3. The colored biaxially stretched polyester film for metal plate attachment and forming processing according to 1 or 2 above, wherein the copolyester forming the layers A or the layer B includes only a copolyester as a resin raw material.

4. The colored biaxially stretched polyester film for metal plate attachment and forming processing according to 1 or 2 above, wherein the copolyester forming the layers A or the layer B includes a blend of a copolyester and a homopolyester as resin raw materials.

5. The colored biaxially stretched polyester film for metal plate attachment and forming processing according to any one of 1 to 4 above, wherein the film is for being attached to a surface of a metal plate that serves as an outer surface of a container.

Advantage of the Invention

The colored biaxially stretched polyester film for metal plate attachment and forming processing of the invention has excellent concealability and exhibits excellent forming processability such that when the film is forming-processed into a can or the like after being attached to a metal plate, the film on the can wall portion is not chipped, scratched, or peeled off. Further, the can or the like after forming (formed product) has excellent appearance.

BEST MODE FOR CARRYING OUT THE INVENTION

Hereinafter, the invention will be described in detail.

The colored biaxially stretched polyester film for metal plate attachment and forming processing of the invention is a three-layer laminate film including opposite surface layers (layers A) and a core layer (layer B). The copolyesters forming the surface layers (layer A) and the core layer (layer B) may be any of polyethylene terephthalate copolymers and polyethylene-2,6-naphthalate copolymers as long as the below-described melting point requirements are satisfied. However, polyethylene terephthalate copolymers are particularly preferable.

The copolymerization component in such a copolyester may be an acid component or an alcohol component. Examples of acid components include aromatic dicarboxylic acids other than the main acid component, such as isophthalic acid, phthalic acid, terephthalic acid, and 2,6-naphthalenedicarboxylic acid, and aliphatic dicarboxylic acids, such as adipic acid, azelaic acid, and sebacic acid. Examples of alcohol components include aliphatic diols, such as 1,6-hexanediol, and alicyclic diols, such as 1,4-hexamethylene dimethanol. They may be used alone, and it is also possible to use two or more kinds. Among them, isophthalic acid and sebacic acid are preferable, and isophthalic acid is particularly preferable.

With respect to the copolymerization proportion of the copolymerization component, in the case of the layers A, it is necessary that the proportion is such that the melting point of the copolyester (TmA) is within a range of 230 to 260° C., preferably 238 to 252° C. A melting point of less than 230° C. results in poor heat resistance, whereby chipping occurs due to heat generation during forming processing, and thus is undesirable. Meanwhile, a melting point of more than 260° C. results in a copolyester with increased crystallinity, whereby the forming processability is impaired, and thus is undesirable.

In the case of the layer B, it is necessary that the proportion is such that the melting point of the copolyester (TmB) is within a range of 230 to 260° C., preferably 242 to 252° C. A melting point of less than 230° C. results poor heat resistance, whereby chipping occurs due to heat generation during forming processing, and thus is undesirable. Meanwhile, a melting point of more than 260° C. results in a copolyester with increased crystallinity, whereby the forming processability is impaired, and thus is undesirable.

As long as the melting points after film production are within the above ranges, the copolyesters forming the layers A and the layer B may each use a copolyester alone or a blend of a copolyester and a homopolyester as resin raw materials. Among them, in terms of forming processability during forming processing into a can and the stability of the film quality, the former method is preferable, and it is particularly preferable that both the layers A and the layer B use a copolyester alone as resin raw material. Meanwhile, according to the latter method that uses a homopolyester as one of resin raw materials, the copolyester forming a layer can be controlled in a block-copolymerized state, not in a random-copolymerized state. Accordingly, when the film is forming-processed into a can after being attached to a metal plate, the orientation of such a layer is enhanced, making it easier to enhance the forming processability. The latter method is preferable in this respect.

In the case where a resin raw material composed of a blend of a copolyester and a homopolyester as resin raw materials is used, it is preferable that the homopolyester content is within a range of 30 to 60 wt % based on the total amount of polyesters forming the layer.

Further, in order to achieve excellent processability such that chipping, scratching, peeling off, or the like does not occur on the can wall portion even when the film is forming-processed under severe conditions, the biaxially stretched polyester film of the invention is subjected to a heat treatment in the course of a series of can manufacturing steps for the purpose of relaxing the stress accompanying the strain applied to the film of the laminate metal plate. Therefore, it is necessary that the difference in melting point between the layers A and the layer B (TmB−TmA) is 4° C. When the melting point difference is more than 4° C., during the heat treatment, the residual stress at the time of can forming is relaxed in the layer B (contraction), while the layers A dissolve and flow, resulting in a film surface with poor appearance; therefore, this is undesirable.

Here, the melting point of a copolyester is measured by a method in which the melting peak is determined at a heating rate of 20° C./min using TA Instruments Q100 DSC. Incidentally, the sample amount should be about 20 mg.

Next, the intrinsic viscosity of the copolyester (polymer portion) forming the layers A in the invention has to be within a range of 0.65 to 0.80, and is preferably within a range of 0.71 to 0.77. In the invention, when the polyester forming the layers A is not a copolyester having a high intrinsic viscosity, a higher-temperature, severer heat treatment is performed in the heat treatment step, resulting in poor appearance after the heat treatment. In the case where the intrinsic viscosity is less than 0.65, the fluidity of the film is likely to change in the heat treatment step, resulting in poor appearance. Meanwhile, an intrinsic viscosity of more than 0.80 is not only over-quality but also decreases the productivity of the raw material copolyester, and thus is uneconomical.

In addition, the intrinsic; viscosity of the copolyester (polymer portion) forming the layer B has to be within a range of 0.55 to 0.70, and is preferably within a range of 0.59 to 0.67. In the case where the intrinsic viscosity is less than 0.55, breakage is likely to occur during film stretching. Moreover, breakage is likely to occur when the obtained film is forming-processed into a can after being attached to a metal plate. In addition, the fluidity of the film is likely to change in the heat treatment step, resulting in poor appearance. Therefore, it is undesirable. Meanwhile, in the case where the intrinsic viscosity is more than 0.70, because a coloring pigment has to be contained at a high concentration in the layer B as described below, pigment aggregation is likely to occur. Moreover, such an intrinsic viscosity is over-quality and also decreases the productivity of the raw material copolyester, and thus is undesirable.

Here, the intrinsic viscosities of the copolyesters of the layers A and the layer B are values obtained by dissolving a resin raw material used for film production in o-chlorophenol, then removing a coloring pigment and the like by a centrifugal separator, and performing measurement from the solution at 35° C. Incidentally, in the case of using a blend of a copolyester and a homopolyester as resin raw materials, the intrinsic viscosity of each of the resin raw materials blended is measured, and their weight average should be within the above range.

Next, it is necessary that the layers A in the invention contain substantially no coloring pigment. "To contain substantially no coloring pigment" herein means that particles of titanium dioxide (serving as a coloring pigment and also as a lubricant), for example, may be contained in a small amount for the purpose of imparting surface smoothness, specifically 0.05 wt % or less, preferably 0.03 wt % or less, and still more preferably 0.01 wt % or less. It is particularly preferable that no coloring; pigment is contained. In the case where the layers A substantially contain a coloring pigment, when the obtained film is forming-processed into a can or the like after being attached to a metal plate, because of the severe processing conditions, the can wall portion is likely to be scratched, resulting in an increased number of surface defects; therefore, this is undesirable. In addition, the film becomes brittle, and film breakage is likely to occur during film stretching.

Meanwhile, it is necessary that the coloring pigment content the layer B is more than 10 wt % and 50 wt % or less, preferably 15 to 40 wt %, and particularly preferably 15 to 30 wt %. In the case where the coloring pigment content is 10 wt % or less, the concealability is poor. Meanwhile, in the case where it is more than 50 wt %, the concealability-improving effect is saturated. Moreover, the film becomes brittle, and film breakage is likely to occur during film stretching. In addition, breakage is likely to occur when the obtained film is forming-processed into a can after being attached to a metal plate. Therefore, it is undesirable. The coloring pigment to be contained in the layer B may be inorganic or organic, but is more preferably inorganic. Preferred examples of inorganic; pigments include alumina, titanium dioxide, calcium carbonate, and barium sulfate, and titanium dioxide is particularly preferable.

In addition, the surface roughness of the film in the invention has to be within a range of 10 to 40 nm, and is still more preferably within a range of 11 to 25 nm. In the case where the surface roughness is lower than the above range, the handleability at the time of winding the produced film into a roll is poor. In addition, when the obtained film is forming-processed into a can or the like after being attached to a metal plate, there is increased friction between the film and the tool. As a result, chipping is likely to occur during forming processing, in which a severer load is applied to the film. In the case where the surface roughness is higher than the above range, when the obtained film is forming-processed into a can or the like after being attached to a metal plate, because of the severe processing conditions, the can wall portion is likely to be scratched.

In order to achieve the above surface roughness, it is preferable that the layers A contain inert particles having an average particle size of 0.5 to 5.0 μm in an amount of 0.01 to 0.5 mass % based on the mass of the layers A. Inert particles to be contained in the layers A are not particularly limited as long as they can be stably present in a polymer, and those known per se can be employed. For example, it is preferable to use an organic substance such as a polymer or a copolymer of monomers selected from polystyrene, methyl polyacrylate, ethyl polyacrylate, methyl polymethacrylate, ethyl polymethacrylate, and divinylbenzene, polytetrafluoroethylene, polyacrylonitrile, benzoguanamine, or silicone, or an inorganic substance such as silica, kaolin, talc, or graphite.

Incidentally, the copolyesters forming the layers A and the layer B may contain, without interfering with the object of the invention, other additives such as fluorescent brighteners, antioxidants, heat stabilizers, UV absorbers, and antistatic agents, as necessary. In particular, fluorescent brighteners are effective for improving the whiteness.

Next, the thickness of the biaxially stretched polyester film of the invention can be suitably changed as necessary, but is preferably within a range of 6 to 75 μm as the entire thickness, more preferably within a range of 10 to 75 μm, and particularly preferably 15 to 50 μm. When the thickness is less than 6 μm, chipping or the like is likely to occur during forming processing, while a thickness of more than 7 μm is over-quality and uneconomical.

Further, as the thickness ratio between the layers A and the layer B ($X_A/X_B$: wherein $X_A$ is the total thickness of the layers A, and $X_B$ is the thickness of the layer B), 0.25 to 0.43 is suitable in terms of forming processability and concealability.

A method for producing the colored biaxially stretched polyester film for metal plate attachment and forming processing of the invention described above is not particularly limited, and may be such that an unstretched laminate sheet is first produced by a conventionally known film production method, followed by stretching in two directions.

For example, a copolyester prepared for the layers A is sufficiently dried and then melted in an extruder at a temperature of the melting point to (melting point+70)° C. At the same time, a copolyester prepared for the layer B is sufficiently dried, then fed to another extruder, and melted at a temperature of the melting point to (melting point+70)° C. Subsequently, by a method in which the two molten resins are laminated in a die, such as a simultaneous lamination extrusion method using a multi-manifold die, an unstretched laminate sheet is produced. According to the simultaneous lamination extrusion method, a melt of the resin to form one layer and a melt of the resin to form, another layer are laminated in a die and, while maintaining the laminated state, formed into a sheet through the die.

Next, the unstretched laminate sheet is sequentially or simultaneously biaxially stretched and then heat-set, whereby the production can be achieved. In the case where the film produced by sequential biaxial stretching, the unstretched laminate sheet is heated by roll heating, infrared heating, or the like, then first stretched in the longitudinal direction, and next stretched in the transverse direction in a stenter. At this time, it is preferable that the stretching temperature is 20 to 50° C. higher than the glass transition points (Tg) of the copolyesters, the longitudinal draw ratio is within a range of 2.5 to 3.6, and the transverse draw ratio is within a range of 2.6 to 3.7. The temperature of heat setting is preferably selected within a range or 150 to 230° C. according to the melting points of the copolyesters so as to adjust the film quality.

As a metal plate to which the colored biaxially stretched polyester film for metal plate attachment and forming processing of the invention is attached, particularly as a metal plate for can manufacturing, a plate of tin, tin-free steel, aluminum, or the like is suitable. Attachment to a metal plate can be performed, for example, by a method in which the metal plate is heated to a temperature equal to or higher than the melting point of the film, then the film is attached to the metal plate, followed by cooling, and the surface part of the film that contacts the metal plate is amorphized and fused thereto. In this case, a polyester film for covering the inner surface of the can is also attached to the other surface of the metal plate and fused thereto at the same time.

In this manner, the polyester film for covering the outer surface of a can and the polyester film for the inner surface of a can are attached to the respective surfaces of the metal plate, and then formed into a metal can or the like by drawing or the like.

At this time, for the purposes of relaxing the stress accompanying the strain applied to the films of the film-laminated metal plate, thereby reducing damage to the films in the subsequent forming processing, a heat treatment is performed in the course of a series of can manufacturing steps.

EXAMPLES

Hereinafter, the invention will be described in detail with reference to examples. However, the invention is not limited to these examples. Incidentally, the characteristic values were measured by the following methods. In addition, unless otherwise noted, "part" and "%" in the examples are by weight.

(Melting Point)

The melting point of a copolyester was measured by the following method. About 20 mg of a sample was taken from each layer of a film, and, using TA Instruments Q100 DSC, and the melting peak was determined while heating at a heating rate of 20° C./min.

(Intrinsic Viscosity)

A copolyester (composition) used for film production was dissolved in o-chlorophenol, then the coloring pigment and the like were removed by a centrifugal separator, and measurement was performed from the solution at 35° C. The unit is dl/g.

(Surface Roughness (Ra))

Measurement was performed using a non-contact three-dimensional surface roughness meter (manufactured by Zygo Corporation: New View 5022) under the following conditions: measurement magnification: 25, measurement area: 283 μm×213 μm (=0.0603 mm$^2$). The center plane average roughness (Ra) was determined using the built-in surface analysis software Metro Pro of the roughness meter and defined as the surface roughness (Ra). Incidentally, the measurement was performed five times at different measurement points on each side, and their average was defined as the center plane average roughness (Ra).

(Forming Processability)

A sample film was attached to one side of a tin-free steel plate having a thickness of 0.25 mm heated to a temperature equal to or higher than the melting points of the copolyesters of the layers A and the layer B, water-cooled, then cut out into a 150-mm-diameter disc shape, and deep-drawn in four stages using a drawing die and a punch, thereby preparing a 55-mm-diameter container having no seam on the side surface. With respect to this can, from the occurrence of chipping and scratching of the polyester film layer on the can wall, the forming processability was evaluated based on the following criteria.

Good: The film is processed without any abnormality, and no microcracking or chipping of the film is seen.

Poor: Microcracking and chipping are seen in the film.

(Concealability)

An L* value that indicates the whiteness of a film sample the CIE 1976 (L*, a*, b*) color space was measured using Spectrocolorimeter SE 6000 manufactured by Nippon Denshoku Industries Co., Ltd., without placing anything under the film, and the concealability was evaluated based on the following criteria.

Excellent: value: 85 or more; This indicates excellent concealability.

Good: L* value: 80 or more and less than 85; This indicates good concealability.

Fair: L* value: 75 or more and less than 80; Concealability is slightly poor.

Poor: L* value: less than 75; Concealability is poor.

(Film Production Stability)

The film production properties in the production of a fair were observed and evaluated based on the following criteria.

Good: No breakage occurs, allowing for extremely stable film production. No cutting occurs for at least four days.

Fair: Cutting sometimes occurs, and film production is unstable. Cutting frequency is (once/four days) or more and less than (once/day) or more.

Poor: Breakage frequently occurs, and stable film production is substantially impossible. Cutting frequency is (1 once/day) or more.

(Appearance after Heat Treatment)

A can having good forming processability was maintained in an oven at 235 to 255° C. for 90 seconds, and then the appearance of the can was evaluated based on the following criteria.

Good: No appearance defects are seen on the film surface of the can.
Poor: The film surface of the can is roughened, and appearance defects are seen.
(Handleability During Winding Up)

A produced film, 1,000 mm in width and 10,000 m in length, was wound up into a roll. The appearance of the wound-up roll was observed and evaluated based on the following criteria.
Good: Film misalignment is not seen at the ends of the roll, and the roll surface is not wrinkled.
Poor: Film misalignment is seen at the ends of the roll, or the roll surface is wrinkled.

Examples 1 to 2 and Comparative Examples 1 to 3

The copolyester for layers A and the copolyester for a layer B using rutile-type titanium dioxide as a coloring pigment shown in Table 1 were each independently dried and melted, then co-extruded from adjoining dies, and rapidly cooled and solidified to give an unstretched laminate film. The copolyester for layers A has added thereto, as inert particles, perfectly spherical silica particles having the average particle size and concentration shown in Table 1. Next, the unstretched film was longitudinally retched at 100° C. to 3 times the original length, then transversely stretched at 130° C. to 3 times the original length, and subsequently heat-set at 165° C. to give a biaxially stretched polyester film. The total thickness of the film was 20 μm, and the thicknesses of the layers A and the layer B were 5 μm (each layer A is 2.5 μm thick) and 15 μm, respectively. The evaluation results of the obtained polyester films are shown in Table 2.

Examples 3 to 4, Comparative Examples 4 to 5

The same procedure as in Example 1 was performed, except that the 50/50 (weight ratio) blend of a copolyester and polybutylene terephthalate shown in Table 1 was used as the polyester for layers A, and the pigment concentration and the average particle size, kind, and concentration of inert particles were as shown in Table 1. The evaluation results are shown in Table 2.

TABLE 1

| | Surface Layers (Layers A) | | | | | Core Layer (Layer B) | | | | Film Surface |
|---|---|---|---|---|---|---|---|---|---|---|
| | Copolyester | | Coloring Pigment | Inert Particles | | Copolyester | | | Coloring Pigment | |
| | Polyester | Melting Point (° C.) | Intrinsic Viscosity | Concentration (wt %) | Average Particle Size-Kind | Concentration (wt %) | Polyester | Melting Point (° C.) | Intrinsic Viscosity | Concentration (wt %) | Roughness (nm) |
| Example 1 | PET-IA4.0 | 248 | 0.71 | 0 | 2.0 μm-Perfectly spherical silica | 0.1 | PET-IA3.2 | 250 | 0.60 | 18.0 | 17 |
| Example 2 | PET-IA4.0 | 248 | 0.71 | 0 | 2.0 μm-Perfectly spherical silica | 0.1 | PET-IA3.6 | 249 | 0.65 | 18.0 | 16 |
| Example 3 | PET-IA4.5/PBT | 241 | 0.72 | 0 | 1.5 μm-Perfectly spherical silica | 0.01 | PET-IA6 | 243 | 0.62 | 18.0 | 11 |
| Example 4 | PET-IA6/PBT | 239 | 0.71 | 0 | 2.0 μm-Perfectly spherical silica | 0.3 | PET-IA6 | 243 | 0.59 | 18.0 | 25 |
| Comparative Example 1 | PET-IA6 | 243 | 0.63 | 0 | 2.0 μm-Perfectly spherical silica | 0.1 | PET-IA6 | 243 | 0.58 | 23.4 | 17 |
| Comparative Example 2 | PET-IA12 | 228 | 0.65 | 0 | 2.0 μm-Perfectly spherical silica | 0.1 | PET-IA12 | 228 | 0.56 | 23.4 | 17 |
| Comparative Example 3 | PET-IA6 | 243 | 0.65 | 0 | 2.0 μm-Perfectly spherical silica | 0.1 | PET-IA6 | 243 | 0.54 | 23.4 | 17 |
| Comparative Example 4 | PET-IA6/PBT | 239 | 0.69 | 5.3 | 2.0 μm-Perfectly spherical silica | 0.1 | PET-IA6 | 243 | 0.59 | 23.4 | 55 |
| Comparative Example 5 | PET-IA7.2/PBT | 238 | 0.70 | 0 | 0.1 μm-Perfectly spherical silica | 0.1 | PET-IA4.0 | 248 | 0.60 | 22.0 | 4 |

PBT: Polybutylene terephthalate

TABLE 2

| | Forming processability Cracking, Chipping, Scratching | Concealability | Film Production Stability | Appearance after Heat Treatment | Handleability at the Time of Winding Up | Overall Evaluation |
|---|---|---|---|---|---|---|
| Example 1 | Good | Excellent | Good | Good | Good | Good |
| Example 2 | Good | Excellent | Good | Good | Good | Good |
| Example 3 | Good | Excellent | Good | Good | Good | Good |
| Example 4 | Good | Excellent | Good | Good | Good | Good |
| Comparative Example 1 | Poor | Excellent | Poor | Poor | Good | Poor |
| Comparative Example 2 | Poor | Excellent | Good | Good | Good | Poor |
| Comparative Example 3 | Poor | Excellent | Poor | Poor | Good | Poor |
| Comparative Example 4 | Poor | Excellent | Fair | Good | Good | Poor |
| Comparative Example 5 | Good | Excellent | Good | Poor | Poor | Poor |

INDUSTRIAL APPLICABILITY

The colored biaxially stretched polyester film for metal plate attachment and forming processing of the invention has excellent concealability and exhibits excellent forming processability such that even when the film is forming-processed into a can, for example, under severe conditions after being attached to a metal plate, the film on the can wall portion is not chipped, scratched, or peeled off. Further, the can after forming has excellent appearance. Therefore, the film is suitable for metal cans, such as beverage cans, food cans, and aerosol cans, for example.

The invention claimed is:

1. A colored biaxially stretched polyester film for metal plate attachment and forming processing, comprising three layers:
   opposite surface layers (layers A), each of which consisting of (i) a copolyester having an intrinsic viscosity of 0.65 to 0.80 and a melting point of 230 to 260° C., (ii) perfectly spherical inert particles having an average particle size of 1.5 to 5.0 μm, wherein the perfectly spherical inert particles are silica, and (iii) substantially no coloring pigment; and
   a core layer (layer B) that is made of a copolyester composition, said copolyester composition having an intrinsic viscosity of 0.55 to 0.70 and a melting point of 230 to 260° C., and has a coloring pigment content of more than 10 wt % and 50 wt % or less,
   wherein the film has a surface roughness within a range of 10 to 40 nm, and the melting points of the copolyester of the layers A and the copolyester composition of the layer B satisfy the following equation (1):

$$TmB-TmA \leq 4° C. \qquad (1)$$

wherein TmA represents the melting point of the copolyester of the layers A, and TmB represents the melting point of the copolyester composition of the layer B, and wherein TmB≥TmA.

2. The colored biaxially stretched polyester film for metal plate attachment and forming processing according to claim 1, wherein the copolyester forming each said layer A is an isophthalic acid-copolymerized polyethylene terephthalate, and wherein the copolyester composition forming the layer B is an isophthalic acid-copolymerized polyethylene terephthalate.

3. The colored biaxially stretched polyester film for metal plate attachment and forming processing according to claim 1, wherein the film is for being attached to a surface of a metal plate that serves as an outer surface of a container.

4. The colored biaxially stretched polyester film for metal plate attachment and forming processing according to claim 2, wherein the film is for being attached to a surface of a metal plate that serves as an outer surface of a container.

5. The colored biaxially stretched polyester film for metal plate attachment and forming processing according to claim 1, wherein the perfectly spherical inert particles have an average particle size of 1.5 to 2.0 μm.

6. The colored biaxially stretched polyester film for metal plate attachment and forming processing according to claim 1, wherein the copolyester composition forming the layer B includes only a copolyester as a resin raw material.

7. The colored biaxially stretched polyester film for metal plate attachment and forming processing according to claim 1, wherein the copolyester composition forming the layer B includes a blend of a copolyester and a homopolyester as resin raw materials.

8. A colored biaxially stretched polyester film for metal plate attachment and forming processing, comprising three layers:
   opposite surface layers (layers A), each of which consisting of:
   (i) a first copolyester composition consisting of a blend of a copolyester and a homopolyester, the first copolyester composition having an intrinsic viscosity of 0.65 to 0.80 and a melting point of 230 to 260° C.,
   (ii) perfectly spherical inert particles having an average particle size of 1.5 to 5.0 μm, wherein the perfectly spherical inert particles are silica, and
   (iii) substantially no coloring pigment; and
   a core layer (layer B) that is made of a second copolyester composition, said second copolyester composition having an intrinsic viscosity of 0.55 to 0.70 and a melting point of 230 to 260° C., and has a coloring pigment content of more than 10 wt % and 50 wt % or less,
   wherein the film has a surface roughness within a range of 10 to 40 nm, and the melting points of the first and second copolyester compositions satisfy the following equation (1):

$$TmB-TmA \leq 4° C. \qquad (1)$$

wherein TmA represents the melting point of the first copolyester composition of the layers A, and TmB represents the melting point of the second copolyester composition of the layer B, and
   wherein TmB≥TmA.

9. The colored biaxially stretched polyester film for metal plate attachment and forming processing according to claim 8, wherein the copolyester of the first copolyester composition is an isophthalic acid-copolymerized polyethylene terephthalate, and wherein the second copolyester composition comprises an isophthalic acid-copolymerized polyethylene terephthalate.

10. The colored biaxially stretched polyester film for metal plate attachment and forming processing according to claim 8, wherein the film is for being attached to a surface of a metal plate that serves as an outer surface of a container.

11. The colored biaxially stretched polyester film for metal plate attachment and forming processing according to claim 9, wherein the film is for being attached to a surface of a metal plate that serves as an outer surface of a container.

12. The colored biaxially stretched polyester film for metal plate attachment and forming processing according to claim 8, wherein the perfectly spherical inert particles have an average particle size of 1.5 to 2.0 μm.

13. The colored biaxially stretched polyester film for metal plate attachment and forming processing according to claim 8, wherein the second copolyester composition includes only a copolyester as a resin raw material.

14. The colored biaxially stretched polyester film for metal plate attachment and forming processing according to claim 8, wherein the second copolyester composition includes a blend of a copolyester and a homopolyester as resin raw materials.

* * * * *